Aug. 23, 1966
W. F. HAIGH ETAL
3,268,655
HIGH VOLTAGE CABLE SPACER-INSULATOR DEVICE
Filed April 20, 1965
3 Sheets-Sheet 3
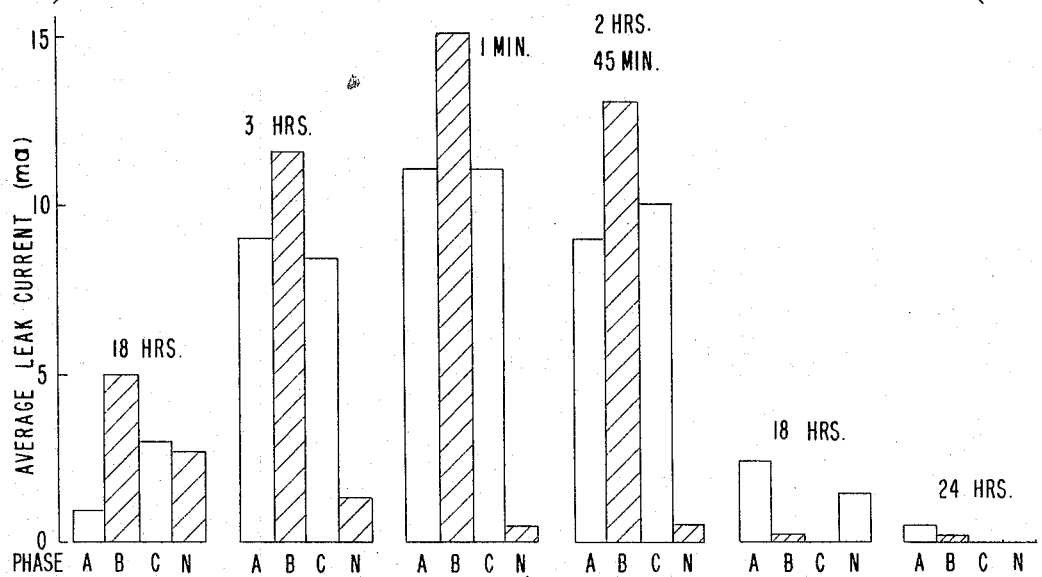
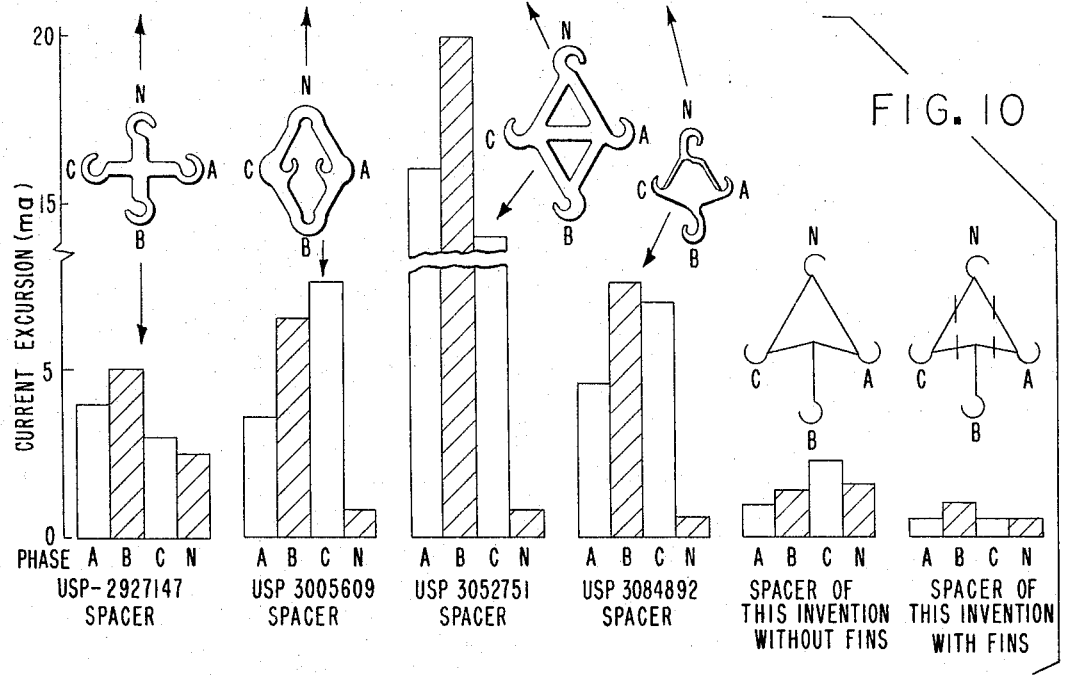
INVENTORS
WILLIAM FRANCIS HAIGH
EUGENE JOSEPH MCMAHON
BY
*Harry C. Braddock*
ATTORNEY United States Patent Office 3,268,655
Patented August 23, 1966

3,268,655
HIGH VOLTAGE CABLE SPACER-INSULATOR DEVICE
William Francis Haigh, Chester, and Eugene Joseph McMahon, West Chester, Pa., assignors, by mesne assignments, to Fargo Manufacturing Company, Inc., a corporation of New York
Filed Apr. 20, 1965, Ser. No. 449,473
7 Claims. (Cl. 174—146)

This invention relates to improved cable spacer devices for supporting, spacing, and electrically insulating the conductors of electric power cables, especially such improved devices for positioning and insulating the multiphase conductors of a high voltage distribution line from each other and a messenger cable.

Such spacer devices should have a long operating life in aerial cable installations which means they must resist the effects of extreme weather conditions, must support heavy loads such as caused by wind or ice, and must be able to handle shock loads or impacts caused by falling objects. It is also highly desirable that these spacer devices have the properties of good insulators, high volume and surface resistances and high dielectric strength even though many phase conductors themselves today are provided with good insulation such as polyethylene coatings for example. The insulating coatings on power cables have resulted in a trend to support the conductor elements of a three-phase system on relatively close centers, and on extended spacing between poles by the use of suitable spacer devices suspended from messenger cables. It is desirable to maintain close spacing between the cables in order to conserve space, especially in wooded areas, and to improve factors such as the lightning shield angle. The usual arrangement is to suspend three-phase conductors in an equilateral triangular arrangement beneath an upper messenger cable by means of the spacer device. The messenger cable may serve as the neutral or ground cable for a three-phase system connected in Y. It is apparent that, especially in high voltage systems such as those in the 10–20 kv. range, the decreased spacing between the cables made possible by improved insulating cable coatings, while desirable, has actually increased the need for spacer devices to have optimum electrical insulation properties if the serious consequences resulting from defects in or breakdown of the insulating coatings, especially under wet contaminated conditions are to be avoided with safety. Many spacer devices of the prior art have indicated in use and under test conditions, relatively high leakage currents when the phase conductor voltages have been applied across these spacer devices. Some of these prior are spacers have actually failed completely and quickly under such conditions, especially those including conditions of high moisture and high surface contaminations of the sort encountered in many areas of spacer device use. The contaminated conditions encountered in many locations involve coatings of dust, dirt, salt, and other matter which build up on the cables and spacers and then under wet conditions, such as rain, form highly conductive paths for electrical current.

It is one object of this invention is provide a cable spacer device which performs its function in an improved manner and overcomes the deficiencies of the prior art spacers.

It is another object to provide an improved spacer device which provides high strength, optimum insulating properties under both wet, and dry conditions, and a self-cleaning action which allows contamination in the form of salt coatings for example, to be washed off when subjected to moisture, without forming a conducting path between the supported cables.

It is another object of this invention to provide an improved spacer device which minimizes surface erosion and radio interference caused by surface arc discharges.

It is another object of this invention to provide an improved spacer device which is simple and economical to manufacture, install, and service yet effective and reliable over long periods of operating life.

The objects of the invention are achieved by an improved spacer device which generally comprises an improved unitary device for supporting, spacing, and electrically insulating electrical cables with an extremely low current leakage under heavy contamination and wet conditions, said device comprising an integral molded structure formed of a hydrophobic, non-tracking, high strength, weather resistant, high resistance, high dielectric strength, synthetic organic polymeric composition, said structure comprising a first portion constructed and arranged for engaging a messenger cable and supporting said device in an operative position thereon, said structure further comprising second, third, and fourth portions each constructed and arranged for receiving, engaging, supporting, and positioning an electrical cable in a fixed position relative to said other portions, said portions interconnected by elongated portions of substantially circular transverse cross section, said elongated portions lying substantially in a given vertical plane when in said operative position, a significant length of said elongated portions connecting any two of said first, second, third, and fourth, in said operative position, maintained at a significant angle relative to the vertical direction to minimize formation of conductive streams of water when said structure is surface contaminated and subjected to wet conditions, said elongated portions arranged such that each is subjected only to forces acting along its elongated dimension when in said operative position, said portions of said structure provided with smooth surfaces free of sharp edges or projections, said composition, the elongated dimensions of said elongated portions, and the transverse cross sections of said elongated portions all selected so that, for a given load requirement, given composition, and given cable spacing, maximum surface and volume resistance is maintained between all of said first, second, third, and fourth portions, concurrently with a high strength to weight ratio for said structure, said portions being constructed and arranged such that said first portion lies substantially at the intersection of a first pair of said elongated portions each of substantially the same length converging at a given acute angle and extending from said second and fourth portions, and a second pair of said elongated portions of substantially equal length also extending from said second and fourth portions to converge in the same general direction as said first pair at an obtuse angle to form a second intersection, said third portion substantially equidistantly spaced from said second and fourth portions, and a single elongated portion connecting said third portion with said second intersection and substantially bisecting said obtuse angle formed by said second pair of elongated members.

Other objects and advantages will be apparent from the following specification and claims, considered together with the accompanying drawings in which:

FIGURE 9 is a graphical comparison of the average leak current in milliamperes for a variety of indicated prior art spacers and spacers of this invention during a test simulating the wet contaminated conditions occurring in actual use.

FIGURE 10 is a graphical comparison of the current excursions in milliamperes for a variety of indicated prior art spacers and spacers of this invention under the same test conditions used in FIGURE 9.

Figure 1:
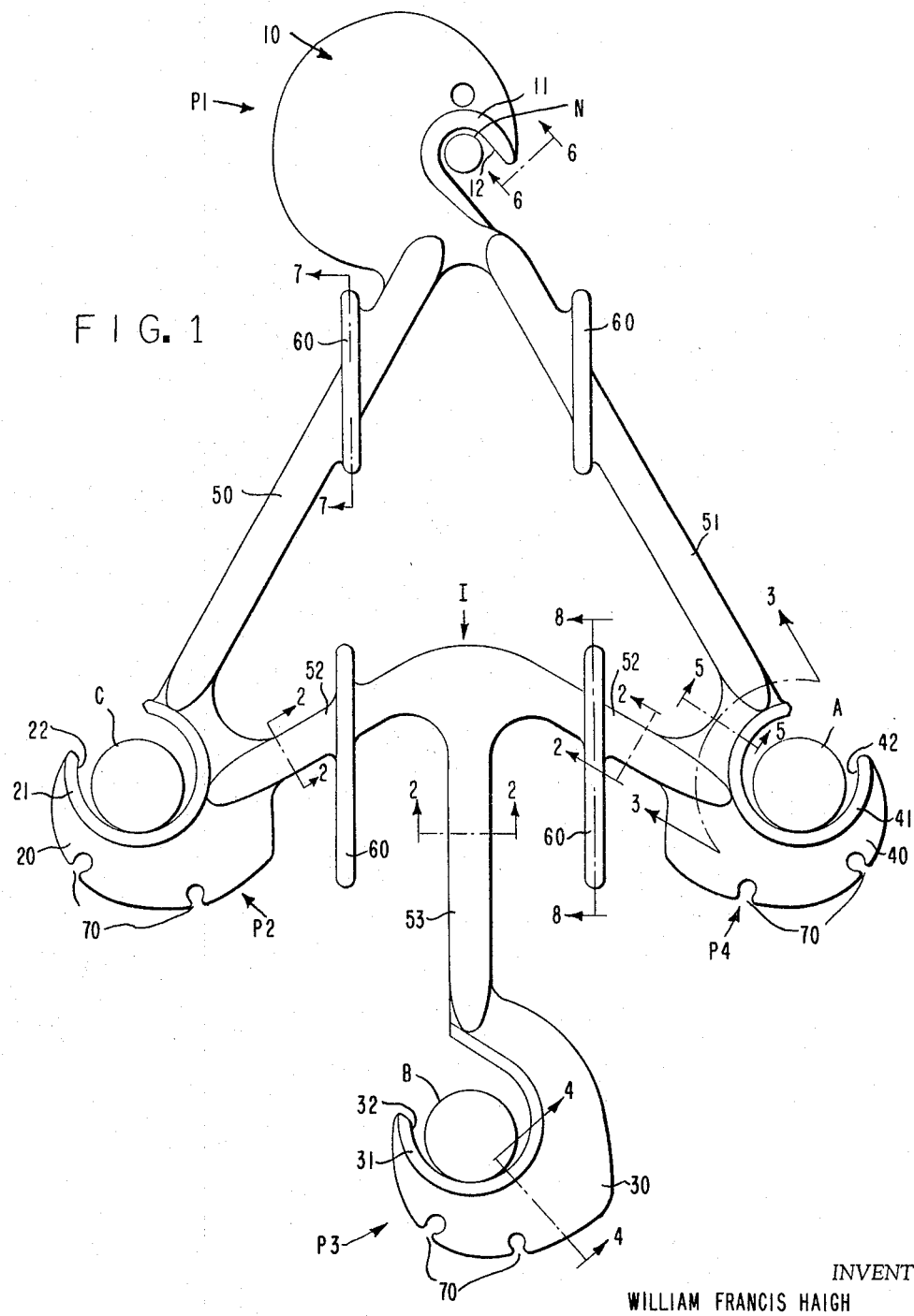
FIGURE 1 is a front elevational view of an improved spacer device embodying the principles of the present invention.
Figure 2:
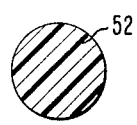
FIGURE 2 is a cross sectional view taken at line 2—2 of FIGURE 1.
Figure 3:
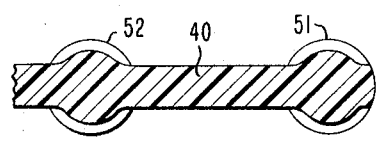
FIGURE 3 is a cross sectional view taken at line 3—3 of FIGURE 1.
Figure 4:
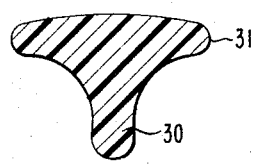
FIGURE 4 is a cross sectional view taken at line 4—4 of FIGURE 1.
Figure 5:
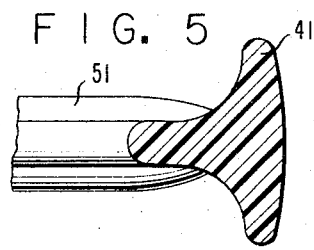
FIGURE 5 is a cross sectional view taken at line 5—5 of FIGURE 1.
Figure 6:
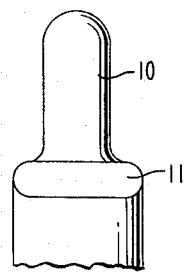
FIGURE 6 is a cross sectional view taken at line 6—6 of FIGURE 1.
Figure 7:
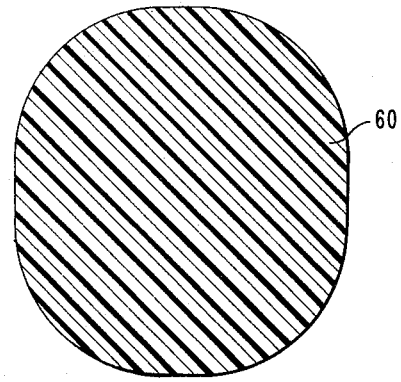
FIGURE 7 is a cross sectional view taken at line 7—7 of FIGURE 1.
Figure 8:
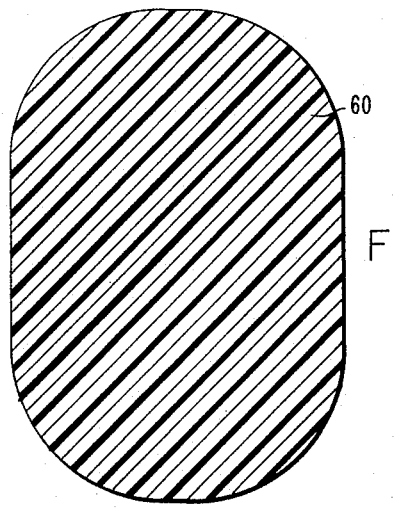
FIGURE 8 is a cross sectional view taken at line 8—8 of FIGURE 1.

The improved insulating spacer device of the invention is shown in FIGURES 1–8 of the drawings and preferably is a unitary integral structure molded in one piece from suitable insulating materials such as acrylics and preferably poly(methylmethacrylate). Other moldable hydrophobic, non-tracking, high strength, weather resistant, high resistance, high dielectric strength materials may of course be used. The device of the invention is prepared with smooth surfaces free of sharp edges or projections. As best shown in FIGURE 1, the device comprises an open framework structure provided with a first inverted hook portion P1 arranged to engage a messenger wire N, the structure also provided with second, third, and fourth hook portions, P2, P3, and P4, respectively each supporting and positioning the power cables A, B, and C of a three phase power supply. Hook portions P2 and P4 are each connected to hook portion P1 by converging elongated portions 50 and 51 of the framework structure. Hook portions P2 and P4 are also connected by converging elongated portions 52 which intersect at I. Hook portion P3 is connected to elongated portions 52 at intersection I by means of elongated portions 53. The elongated portions are formed with substantially circular transverse cross sections to give a minimum current leak path front and maintain maximum resistance for a given length and weight of spacer material.

Hook portion P1 comprises a flat or planar part 10 in which is formed the opening 12, for receiving the messenger cable N, the edges of which opening are given increased thickness as at 11. The cross section of hook portion P1 is indicated more clearly in FIGURE 6.

Hook portions P2, P3, and P4 each comprise flat or planar parts 20, 30, and 40 in which are formed openings 22, 32 and 42 for receiving the phase power conductor cables A, B, and C. The edges of openings 22, 32, and 42 are given increased thickness as at 21, 31, and 41 to provide better support for the cables. The cross sections of these hook portions are illustrated in the cross sectional views of FIGURES 3, 4, and 5. The notches 70 in the planar parts of the hook portions are for the purpose of securing conventional clamping elements which hold the conductor cables A, B, and C in the hook portion openings.

The insulating spacer device of the invention may be constructed with or without self-cleaning moisture deflecting elements 60 although for many applications their presence is preferred.

With hook portion P1 engaging a messenger cable N and conductor cables A, B, and C supported in hook portions P2, P3, and P4 the operative position of the device will be as shown in FIGURE 1 with the elongated portion 53 extending in the vertical direction.

The insulating spacer device is constructed so that in its operative position the elongated portions extending between any of the hook portions have at least one portion of significant length positioned at a significant angle with respect to the vertical direction. This has been found necessary under wet contaminated conditions in order to minimize leakage current between the cables. Leakage current under such conditions is a maximum when an elongated portion lies in the vertical direction and is a minimum when such portion lies in a horizontal direction.

The performance of the insulating spacer of the invention is further improved under contaminated wet conditions by addition of the moisture deflecting elements 60 which not only direct streams of conductive moisture transversely of the elongated portions to prevent bridging of the cables by such streams, but also are self-cleaning to remove from their surfaces under wet conditions any coating of conductive surface contamination which may build up thereon.

The absence of fins and sharp-edged projections on the insulating spacer of this invention minimizes surface arc discharges which occur under some conditions and are highly undesirable from the standpoint of causing surface erosion and radio-frequency interference. The addition of the moisture deflecting elements, while increasing to some degree the amount of surface discharges, does not, because of their carefully controlled construction and small number, increase the surface discharges to a level which would cause serious problems.

The elongated portions interconnecting the hook portions are arranged so that substantially the only forces acting on them are those placing the elongated portions in tension or compression. Considering the device of the invention under load as in FIGURE 1, it will be seen that portions 50, 51, and 53 are subjected to tensional forces while portions 52 are maintained in compression. This is due to a careful selection of the angles between portions 50 or 51 and the vertical and between portions 52 and the horizontal. The relationship is preferably that in which the cotangent of the angle between either portion 50 or 51 and the vertical is substantially equal to three times the tangent of the angle between either portion 52 and the horizontal.

While this relationship of angles is important for the ordinary conditions of cable support and positioning, the construction of the spacer device of the invention is well suited to accommodate and survive occasional sudden physical shocks or impacts against the cables or hook portions because of the non-rigid structural geometry, which although primarily maintained in tension or compression under load, is nevertheless capable of some limited resilient bending action, for example, vertical impacts on hook portion P3 or cable B can result in, or be taken up to some extent by lateral or horizontal displacement of hook portions P2 and P4. This is a quite different and improved result compared with that obtained for example in a fixed triangular structure.

The bar graphs shown in FIGURES 9 and 10 demonstrate the effectiveness, under wet contaminated conditions, in controlling leak current of four commercially available prior art acrylic spacers of different constructions compared to the construction of this invention which is of comparable size and rating.

The tests were run using three phase power in a "wet" chamber using bare metal electrodes. The phase to phase voltage was 20 kilovolts with 11.6 kilovolts between the phases and the neutral (ground) line. The resistivity of the "rain" was controlled at 5000 ohm centimeters, by adding sodium chloride to tap water, and the "rainfall" amount was 12 inches per hour. The "rain" was applied continuously by a plurality of bathroom shower heads from a distance of several feet.

The duration of each test is indicated above each set of data for each spacer device and the spacer devices are identified. The prior art spacer showing the highest leak currents was terminated after one minute because it failed as the result of an A to C phase flashover. This test was repeated with the same result. The ABC and N reference letters indicate the phases in which the currents were measured.

The upper graph of FIGURE 9 shows the average leak current in milliamperes measured in each phase for each of the spacers tested. The lower set of data of FIGURE 10 represents the amplitude of the relative leak current excursions for the discharge pulses. These are directly related to the visible discharges observed in a darkened laboratory and are proportional to the magnitude of radio noise interference which is undesirable in a residential area. Also, discharge currents above three milliamperes, as measured with the previously described recording equipment, contain enough thermal energy to erode the surface of an acrylic insulator and damage the mechanical structure.

It is believed to be clear that we have provided a novel, much improved insulating spacer for high voltage cables in accordance with the objects of the invention.

We do not intend to be limited to the details shown and described, since modification and alterations within the spirit of the invention will occur to those skilled in the art, and all such are considered to fall within the scope of the following claims.

We claim:

1. An improved unitary device for supporting, spacing, and electrically insulating electrical cables with an extremely low current leakage under wet and heavily contaminated conditions, said device comprising an integral molded structure formed of a hydrophobic, non-tracking, high strength, weather resistant, high resistance, high dielectric strength, synthetic organic polymeric composition, said structure comprising a first portion said first portion having its structure constructed and arranged for engaging a messenger cable and supporting said device in an operative position thereon, said structure further comprising second, third, and fourth portions, each of said second, third, and fourth portions having their structures constructed and arranged for receiving, engaging, supporting and positioning an electrical cable in a fixed position relative to said other portions, said portions interconnected by elongated portions of substantially circular transverse cross section, said elongated portions lying substantially in a given vertical plane when in said operative position, a significant length of said elongated portions connecting any two of said first, second, third and fourth portions, in said operative position, maintained at a significant angle relative to the vertical direction to minimize formation of conductive streams of water when said structure is surface contaminated and subjected to wet conditions, said elongated portions cooperating with each other and with said first, second, third, and fourth portions arranged such each of said elongated portions is subjected primarily to forces acting along its elongated dimension when in said operative position, all of said portions of said structure provided with smooth surfaces free of sharp edges or projections, said composition, the elongated dimensions of said elongated portions, and the transverse cross sections of said elongated portions all cooperating to maintain, for a given load requirement, given composition, and given cable spacing; maximum surface and volume resistance between all of said first, second, third, and fourth portions, concurrently with a high strength to weight ratio for said structure.

2. The device of claim 1 in which said structure is provided with a moisture deflecting means positioned between each of said first, second, third, and fourth means.

3. The improved device of claim 1 in which said portions being constructed and arranged such that said first portion lies substantially at the intersection of a first pair of said elongated portions each of substantially the same length converging at a given acute angle and extending from said second and fourth portions, and a second pair of said elongated portions of substantially equal length also extending from said second and fourth portions to converge in the same general direction as said first pair at an obtuse angle to form a second intersection, said third portion substantially equidistantly spaced from said second and fourth portions, and a single elongated portion connecting said third portion with said second intersection and substantially bisecting said obtuse angle formed by said second pair of elongated members.

4. An improved unitary electrical insulator device for supporting and positioning three electrical cables for carrying three phase power on a messenger cable, said device comprising an integrally formed smooth surfaced open framework structure formed of a hydrophobic, non-tracking, high strength, weather resistant, high resistance, high dielectric strength polymeric composition, said structure comprising a first inverted hook portion constructed and arranged for operatively engaging a messenger cable to support said device in an operative position thereon, said structure further comprising second, third, and fourth hook portions in operative position each constructed and arranged to receive, engage, support, and position an electrical power cable in a fixed position relative to said other portions, said hook portions interconnected by elongated portions of substantially circular transverse cross section, said elongated portions lying substantially in the same vertical plane when said device is in said operative position, a significant length of said elongated portions connecting any two of said hook portions maintained at a significant angle relative to the vertical direction when said device is in the operative position to minimize leakage currents when said device is subjected to wet contaminated conditions, said hook portions arranged such that in said operative position, one of said second, third, and fourth hook portions is positioned directly below said first hook portion and spaced a given distance below it, and the other two hook portions are maintained in opposed corresponding positions horizontally spaced a selected distance on either side of a vertical line joining the first and said one of said hook members, said other two hook portions positioned at a vertical level intermediate the said first hook portion and said one of said hook portions, said structure further comprising elongated portions connecting each of said other two hook portions to said first hook portion, said structure further comprising inclined elongated portions also connected to and extending upwardly from each of said other two hook portions and intersecting at a point equidistant from said other two hook portions to give an inverted V configuration in said operative position, an elongated portion connecting said one hook portion with said upwardly inclined elongated portions at said point of intersection, to give, in said operative position, and arrangement of said framework structure in which said elongated portions are subjected to cable load forces acting primarily along their elongated dimensions, the elongate dimensions and transverse cross sections of said elongated portions cooperating to provide, for a given load requirement, given composition, and given cable spacing, maximum surface and volume resistance between all of said first, second, third, and fourth portions and also to provide a high strength to weight ratio for said structure.

5. The device of claim 4 in which said composition consists essentially of (poly)methyl methacrylate.

6. The device of claim 4 in which said framework structure is provided with moisture deflecting means positioned between each of said hook portions.

7. The device of claim 6 in which each said moisture deflecting means is substantially planar in configuration, extending transversely of said elongated portions, and lying in a substantially vertical plane in said operative position such that a self-cleaning action occurs on said deflecting means under wet contaminated conditions.

References Cited by the Examiner
UNITED STATES PATENTS

| | | | |
|---|---|---|---|
| 3,052,751 | 9/1962 | Volk et al. | 174—146 |
| 3,076,865 | 2/1963 | Volk et al. | 174—146 |
| D. 195,205 | 5/1963 | Price. | |
| D. 197,010 | 12/1963 | Keltz | 174—146 |

OTHER REFERENCES

Electrical World, PLM Advertisement, vol. 157, No. 3, Jan. 15, 1962, p. 35 (TK–1.E6).

Electrical World, Hendrix Advertisement, vol. 158, No. 22, Nov. 26, 1962, p. 61 (TK–1.E6).

References Cited by the Applicant
UNITED STATES PATENTS

| | | |
|---|---|---|
| 2,927,147 | 3/1959 | Flower. |
| 3,005,609 | 10/1961 | Joffe. |
| 3,084,892 | 4/1963 | Priestley et al. |

LARAMIE E. ASKIN, *Primary Examiner.*